United States Patent Office 3,297,514
Patented Jan. 10, 1967

3,297,514
TENSILE BAND
Rudolf Poeschl, 135 Mariahilferstrasse, Vienna, Austria, and Wilhelm Poeschl, Rohrbach, Upper Austria, Austria
Filed Mar. 11, 1963, Ser. No. 264,321
Claims priority, application Austria, Mar. 13, 1962, A 2,091/62
14 Claims. (Cl. 161—76)

Drive belts consisting of leather, woven fabric, rubber or the like have the disadvantage that it is not possible to separate permanent elongation from elastic elongation within the total elongation. For this reason, such belts have to be re-tensioned, which is considered a disadvantage just as is the small load capacity of such belts.

It has been attempted to eliminate these disadvantages by compound belts consisting of a tensile band of fiber-oriented polyamide and friction and covering layers. These structures, however, have the disadvantage of possessing a relatively high modulus of elasticity such as, for example, about 6250. In practice this means that, for example, the elastic elongation may be 2.4% under a load of 150 kg./sq. cm., which with flat belt drives generally corresponds to an initial stress which does not exceed the allowable shaft pressure amounting, e.g., to two or three times the peripheral force. Whereas such belts are fully elastic so that theoretically they need not be re-tensioned, they have the important disadvantage that they increase in length considerably under the influence of moisture and contract under dry heat. The two changes in length amount to a total of about 2% so that a belt mounted with an initial stress of about 2.4% may become slack due to an increase in length and may contract to cause the bearings to run hot. In the known structures, the requirement for a lower modulus of elasticity, i.e., for a larger fully elastic elongation due to prestressing to accommodate the variation in length due to environmental conditions, cannot be complied with owing to the value of the modulus of elasticity of fiber-oriented polyamides.

It is an object of the invention to provide a tensile band for belts of all kinds, which band operates without need for re-tensioning and can readily accommodate the above-mentioned variation in length resulting from environmental conditions.

The invention provides a tensile band which consists of at least two layers of synthetic thermoplastics, particularly of polyamides, which are bonded together and at least one of which is a layer of woven fabric of plastic. A feature of the invention is that a layer which substantially takes up the tension consists of a woven fabric of plastic, the warp and weft of which consist of fiber-orientated mono- or multifilaments and is bonded to an extensible, substantially non-compressible sheeting of plastic, which has not been fiber-oriented and which receives the bonding agent and supports the fabric layer transversely to the direction of tension. As a result, the additive coaction of the natural elasticity of the warp filaments and the resistance of the supported filling filaments to deformation provides a modulus of elasticity below 5000 kg./sq. cm.

As distinguished from known belt structures, the layer consisting of the woven fabric of plastic in the structure according to the invention takes up substantially the entire tension whereas the sheeting of plastic determines only the shape and prevents a reduction of the width of the belt. Because the sheeting of plastic receives or carries the bonding agent, the latter will attack the woven fabric of plastic only to the extent required for a reliable bond between the sheeting of plastic and the woven fabric of plastic. If a tension is exerted on the warp filaments of the woven fabric of plastic, the warp filaments will be stretched and tend to align in a plane. This stretching of the warp filaments results in an elongation of the weft filaments so that the elasticity of the latter contributes to the total elasticity of the tensile band. The warp filaments being bonded to the substantially incompressible sheeting of plastic, an elastic elongation of the weft filaments is enforced and the weft filaments are prevented from merely entwining the warp filaments without elastic elongation. Thereby the modulus of elasticity may be reduced much below 5000 kg./sq. cm. and values below 2500, for instance, 2350, can be attained without difficulty. If the entire tensile band has a modulus of elasticity of 2350, it will have a fully elastic elongation of 5.1% under a load of 120 kg./sq. cm. so that the variation in length due to environmental conditions, amounting to about 2%, can well be accommodated.

The term "fiber-oriented" plastic material means in this connection a plastic material which has been elongated to such a limit that, when this limit is exceeded, the material has a high resistance to further elongation. This resistance occurs approximately at an elongation to about 2½ to 3 times of its original length. By this elongation, the fibers of the plastic material are oriented, and this is described by the term "fiber-oriented." Plastic material treated in such a manner has a high tensile strength.

In a preferred embodiment of the invention, the arrangement is such that the sheeting of plastic carries the bonding agent in a layer of uniformly controlled height to provide for a surface bond of limited penetration between the woven fabric of plastic and the sheeting of plastic. Whereas the resulting bond between the woven fabric of plastic and the sheeting of plastic will be sufficient for supporting the weft filaments as is required according to the invention, the bonding agent cannot exert an excessive action on the sheeting of plastic so as to substantially reduce the elasticity and/or tearing strength thereof. The height of the layer of the bonding agent received or carried by the sheeting of plastic may be dimensioned to provide for any desired penetration with respect to the weft and/or warp filaments of the woven fabric of plastic so that in an extreme case of a surface bond this may be restricted to a mere punctiform or linear bond between the sheeting of plastic and the woven fabric of plastic. This could not be achieved by a coating on the woven fabric of plastic because in this case the bonding agent would exert an uncontrolled influence on the woven fabric of plastic and would adversely affect the tearing strength thereof in an intolerable manner.

Because the invention enables an exact control of the attack of the bonding agent on the woven fabric of plastic and on the bond between the sheeting of plastic and the woven fabric of plastic, a restricted reduction of the tearing strength of the woven fabric of plastic can be tolerated in order to promote a reliable bond because this reduction is known in advance and is the same at all points. In accordance with the invention the height of the layer of the bonding agent applied to the sheeting of plastic is suitably so dimensioned that at least 50% of the tearing strength of the woven fabric of plastic is preserved. A tearing strength of 70–90%, based on the original woven fabric of plastic, can readily be achieved in conjunction with a reliable bond between the sheeting of plastic and the woven fabric of plastic.

To facilitate the bonding, the invention teaches that the sheeting of plastic and the woven fabric of plastic should have the same or a similar solubility in the bonding agent and should preferably consist of the same plastic or of plastics related in kind.

In order to enable the manufacture of tensile bands of any desired thickness and a selection of any desired characteristics of the tensile band by the use of appropriate layers of woven fabric of plastic and of the sheeting of plastic, the invention contemplates the provision of two or more layers of woven fabric of plastic bonded to interleaved sheetings of plastic so that there is at least one sheeting of plastic between any two layers of woven fabric. To provide for special characteristics, the cross-sections of the weft filaments of the woven fabric of plastic may differ from the cross-sections of the warp filaments. Within the scope of the invention, the sheetings of plastics may also have different cross-sections.

Friction and/or covering layers, preferably of leather, are suitably applied to the tensile band according to the invention.

The process according to the invention of manufacturing the tensile band resides essentially in that a bonding agent capable of partly dissolving the sheeting and the woven fabric of plastic is applied to the homogeneous sheeting of plastic and is partly dried, in order to ensure a controlled penetration into the layer of woven fabric of plastic to be bonded, whereafter a layer of woven fabric of plastic is applied to the layer of the bonding agent and the bond is effected under the action of pressure and heat.

In bonding the polyamide woven fabrics, a considerable destruction of the yarn as occurs in the known processes is thus prevented because the action of the bonding agent of the layers of woven fabric of plastic can be exactly controlled by the selection of the amount and thickness of the layer in which the bonding agent is applied to the sheeting of palstic and of the degree to which it is dried. Thus, the layer of woven fabric of plastic is attacked by the bonding agent only to the extent which is indispensable for achieving a reliable bond. As a result, the reduction of the tearing strength of the woven fabrics of plastic is minimized and the desirable properties of the woven fabric of plastic are preserved.

Also within the scope of the invention, a bonding agent melting at an elevated temperature (such as 110° C.) may be applied in a dry condition to the homogeneous sheeting of a synthetic thermoplastic to a height which corresponds to the desired penetration into the layer of woven fabric of plastic to be bonded. The layer of woven fabric of plastic is then applied to the bonding layer and the bond is effected under the action of pressure and heat. This mode of bonding affords also the advantages mentioned hereinbefore.

To attain further improvements in properties, it is contemplated by the invention to subject the layers of woven fabric of plastic to an additional orientation of their fibers by stretching or calendering them before or after they are bonded to the homogeneous sheeting of plastic.

The contact or cover layers to be applied to the tensile band for the purposes of the invention are suitably coated first with a layer of plastic, as is known per se, and this layer of plastic is then used for bonding to the tensile band. The bond may be effected by a sheeting of plastic placed between the outermost layer of woven fabric of plastic of the tensile band and the covering of plastic on the friction or covering layer and in the manner described hereinbefore by a controlled application of the bonding agent.

The invention is particularly suitable for belts, flat belts, V-belts, circular section belts and conveyor belts of all kinds and for all textile machine elements stressed in tension, such as spindle tapes, web dividing tape, rubbing leathers, comber leathers, rubbing condensers, beater caps and the like. Instead of polyamides, polyurethanes may be used, e.g., as plastic material.

The invention will be described more in detail hereinafter with reference to some illustrative embodiments.

*Example 1*

A polyamide sheeting of 1 mm. thick is drawn through a resorcinol-methanol solution, air-dried to 85% and then placed between two woven fabric layers of multifilament yarns of fiber-oriented polyamide. The polyamide-resorcinol solution has only a slightly tacky consistency and a penetration of 0.09 mm. The three layers are pressed together under the application of pressure and heat. The interlayer of polyamide, which has not been fiber-oriented but resists compression, will follow any desired longitudinal extension but will ensure that the tensile band will retain its minimum width so that the stress to be taken up by the weft filaments is maintained.

*Example 2*

Example 1 is followed but the layers of woven fabric of plastic are subjected to an additional orientation of the fibers under the action of pressure and heat before they are bonded to the polyamide sheeting.

*Example 3*

Example 1 is followed but the layers of polyamide woven fabric are subjected to an additional orientation of the fibers under the action of pressure and heat after they are bonded to the polyamide sheeting.

*Example 4*

A conveyor belt is to be made in the form of a tensile band consisting of four layers. Three foils are interleaved between the four woven fabric layers to ensure an intimate bond and three sheetings are applied as bottom and top cover layers. Resorcinol powder in a height of 0.1 mm. is dusted onto both sides of the bonding sheetings and to the inside of the outer sheetings and retained thereon with the aid of an auxiliary adhesive. Under the action of pressure and heat at 110° C., a resorcinol powder melt is produced, which due to its high viscosity has a low penetration to effect a perfect bond to the woven fabric layers.

*Example 5*

A driving belt is to be provided with the tensile band according to the invention. For this purpose a tensile band consisting of three layers of woven fabric and two interleaved sheetings is made by the process described. Then a leather band is coated with dissolved polyamide plastic and entirely dried. A bonding sheet having on both sides a controlled amount of a resorcinol solution dried to a high viscosity or of the dusted and adhered resorcinol powder is interleaved between the leather band and the tensile band. Under the action of pressure and a temperature of 110° C., the bonding sheeting bonds on one side to the polyamide coating on the leather whereas on the other side a contact with the woven fabric of polyamide is established only in a controlled depth. The cover layer of the tensile band is simply provided in the form of a polyurethane coating.

*Example 6*

A rubbing condenser is to be made, in which, e.g., 20 rubbing leathers are to be used for stretching (elongating) yarns. The tensile band having a modulus of elasticity below 5000 is adhered just as in Example 5 between the two leather layers of the rubbing leather. Because all rubbing leathers are engaged by one and the same retensioning device, the increased, fully elastic elongation due to re-tensioning of the tensile band according to the invention is of great advantage for a uniform initial stress.

*Example 7*

Web dividing tapes made according to the same method have a modulus of 2350 resulting in a high elastic initial stress which accommodates all differential stresses occurring in a finisher card. Because the tapes must be jointly prestressed in sets of 60, the increased elastic elongation due to prestressing is of great importance for eliminating differences in length.

*Example 8*

Beater caps must have an increased elasticity to reduce the hard impact. Because polyamide bands having a modulus of elasticity of about 6000 have been found to be deficient in impact strength, beater caps are made by arranging the woven fabrics of fiber-oriented polyamide multifilaments in the shape of a horseshoe, providing them with interleaved sheetings and an outer sheeting and with solvent, and hot pressing.

Figure 1:
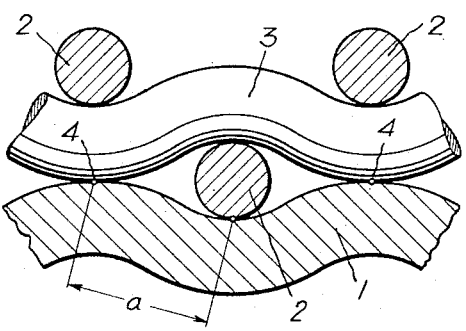
FIG. 1 is a cross-section of a woven fabric of plastic bonded to a sheeting of plastic in unloaded condition.

In FIG. 1, 1 is a sheeting of plastic, 2 are the warp filaments of the woven fabric of plastic and 3 are its weft filaments. For the sake of simplicity, the bond between the woven fabric 2, 3 of plastic and the sheeting 1 of plastic is shown only in the form of points and lines at 4.

As is shown in FIG. 1, the weft filaments are only slightly curved in the unloaded condition whereas the warp filaments have a relatively large vertical spacing. The sheeting 1 is slightly deflected. If it has an appropriate thickness or another woven fabric 2, 3 of plastic is provided on the other side of the sheeting, however, the latter may be planar also in the unloaded condition.

Figure 2:
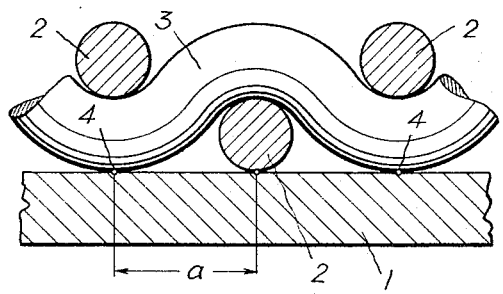
FIG. 2 shows the same in loaded condition.

FIG. 2 shows the tensile band in loaded condition. The vertical spacing between the warp filaments is now smaller than in FIG. 1 because the warp filaments tend to align in a plane under the influence of the tension. This tendency of the warp filaments to align results in a greater curvature of the weft filaments. This would correspond to a reduction of the overall width of the tensile band. Such a reduction is prevented, however, by the substantially non-compressible sheeting 1 of plastic so that the increased curvature of the weft filaments 3 involves an elongation thereof. The resistance of the weft filaments to deformation is added to the elasticity of the warp filaments so that the modulus of elasticity of the tensile band is reduced and its overall elasticity is increased.

Because the warp and weft filaments are bonded to the sheeting at 4, the latter will be stretched and aligned into a plane if it was not planar before. The distance *a* (FIGS. 1, 2) is never reduced compared to the unloaded condition of the tensile band (FIG. 1) but may be increased under the action of the tensile stress because the sheeting of plastic can readily follow an elongation. After the application of tensile stress, the elongated sheeting of plastic serves for returning the band to its original condition.

Figure 3:
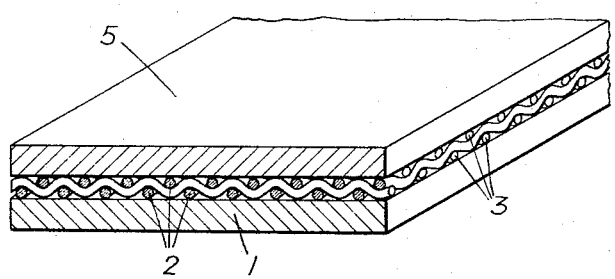
FIG. 3 shows in perspective view of a portion of a driving belt provided with a tensile band according to the invention.

The driving belt shown in FIG. 3 has a cover layer 5, preferably of leather, which is bonded to the tensile band. The latter consists of the sheeting 1 of plastic and the woven fabric of plastic consisting of the warp filaments 2 and the weft filaments 3 and bonded to the sheeting in the manner described.

A layer of woven fabric of plastic may also be provided on the underside of the sheeting 1 of plastic and may be provided with a friction covering, preferably of leather.

What we claim is:

1. An elastic tensile band for machine elements stressed in tension, comprising a first layer constituted of a woven fabric of thermoplastic material, said fabric having fiber-oriented warp filaments and fiber-oriented weft filaments extending substantially perpendicular to one another, said warp filaments extending in the longitudinal direction of the tensile band, a second layer constituted by an extensible, substantially non-compressible sheet of thermoplastic material free of oriented fiber having opposite surfaces, said band further comprising means constituted by a binding agent engageably connecting individual filaments of said fabric in restricted tangential contact zones to said sheet, said sheet abutting said fabric transversely to the direcion of tension, such that the additive coaction of the intrinsic elasticity of said warp filaments and the resistance against deformation of said supported weft filaments results in a modulus of elasticity of the entire tensile band below 5000 kg./sq. cm., substantially the whole tension exerted on the tensile band being taken up by said fabric.

2. A tensile band as claimed in claim 1, wherein said woven fabric and said sheet are polyamides.

3. A tensile band as claimed in claim 1, wherein said warp and filling of said woven fabric consist of fiber-oriented multi-filaments.

4. A tensile band as claimed in claim 1, wherein said sheet carries said connecting agent in a layer of uniformly controlled thickness to provide for a surface bond of limited penetration between said woven fabric and said sheet.

5. A tensile band as claimed in claim 4, wherein said sheet carries said connecting agent in a layer, the thickness of which is sufficiently low to preserve the tearing strength of said woven fabric to at least 50%.

6. A tensile band as claimed in claim 1, wherein said sheet and said woven fabric have at least a similar solubility in said bonding agent.

7. A tensile band as claimed in claim 6, wherein said sheet and said woven fabric consists of the same kind of thermoplastic material.

8. A tensile band as claimed in claim 1, comprising a second fabric layer, and at least two further layers each consisting of a sheet of thermoplastic material arranged such that said layers alternate with each other so that there is always at least one sheet between two woven fabrics.

9. A tensile band as claimed in claim 1, wherein the cross-sections of said filling filaments of said woven fabric differ from the cross-sections of said warp filaments.

10. A tensile band as claimed in claim 8, wherein the cross-sections of said sheets of plastic differ from each other.

11. A tensile band as claimed in claim 1, comprising a friction layer bonded to said woven fabric.

12. A tensile band as claimed in claim 1, wherein a cover layer is bonded to said woven fabric.

13. A tensile band as claimed in claim 11, wherein said friction layer consists of leather and is bonded to said woven fabric by means of a layer of plastic material applied to said leather layer.

14. A tensile band as claimed in claim 12, wherein said cover layer consists of leather and is bonded to said woven fabric by means of a layer of plastic material applied to said leather layer.

References Cited by the Examiner

UNITED STATES PATENTS

| | | | |
|---|---|---|---|
| 2,386,761 | 10/1945 | Wetherbee | 156—140 |
| 2,706,699 | 4/1955 | Plansoen et al. | 161—89 |
| 2,995,176 | 8/1961 | Waugh | 161—227 X |
| 3,219,039 | 11/1965 | Ambrose et al. | 161—77 |

FOREIGN PATENTS

| | | |
|---|---|---|
| 761,410 | 11/1956 | Great Britain. |
| 806,204 | 12/1958 | Great Britain. |

EARL M. BERGERT, *Primary Examiner.*

J. J. BURNS, T. R. SAVOIE, *Assistant Examiners.*